United States Patent
Zhong et al.

(10) Patent No.: US 10,261,280 B1
(45) Date of Patent: Apr. 16, 2019

(54) OPTICAL FIBER DISTRIBUTION BOX

(71) Applicant: Amphenol Fiber Optic Technology (Shenzhen) Co., Ltd., Shenzhen, Guangdong Province (CN)

(72) Inventors: Jun-Lin Zhong, Shenzhen (CN); David Frey, Shenzhen (CN); Linghua Zhu, Shenzhen (CN); Xing-Fu Mo, Shenzhen (CN)

(73) Assignee: AMPHENOL FIBER OPTIC TECHNOLOGY (SHENZHEN) CO., LTD., Shenzhen, Guangdong Province (CN)

( * ) Notice: Subject to any disclaimer, the term of this patent is extended or adjusted under 35 U.S.C. 154(b) by 0 days.

(21) Appl. No.: 16/139,710

(22) Filed: Sep. 24, 2018

(30) Foreign Application Priority Data

May 23, 2018 (TW) .............................. 107206743 U

(51) Int. Cl.
  *G02B 6/46* (2006.01)
  *G02B 6/44* (2006.01)
(52) U.S. Cl.
  CPC ......... *G02B 6/4452* (2013.01); *G02B 6/4446* (2013.01); *G02B 6/4471* (2013.01)
(58) Field of Classification Search
  CPC .. G02B 6/4441; G02B 6/4442; G02B 6/4444; G02B 6/4445; G02B 6/4447; G02B 6/4448; G02B 6/445; G02B 6/4451; G02B 6/4471
  See application file for complete search history.

(56) References Cited

U.S. PATENT DOCUMENTS

| | | | | |
|---|---|---|---|---|
| 6,185,303 | B1 * | 2/2001 | Losey | A47B 96/06 248/219.4 |
| 6,229,948 | B1 * | 5/2001 | Blee | G02B 6/483 385/134 |
| 6,486,399 | B1 * | 11/2002 | Armstrong | H05K 5/0204 174/58 |
| 6,766,992 | B1 * | 7/2004 | Parker | F16M 13/022 248/218.4 |
| 7,664,360 | B2 * | 2/2010 | Cox | G02B 6/4439 385/135 |
| 9,513,451 | B2 * | 12/2016 | Corbille | G02B 6/4454 |
| 9,810,369 | B2 * | 11/2017 | Lilieholm | H01Q 1/1207 |
| 2005/0056743 | A1 * | 3/2005 | Ware | F16L 3/137 248/218.4 |

(Continued)

FOREIGN PATENT DOCUMENTS

EP        2230738 A2 *  9/2010  .......... G02B 6/4441
WO   WO-9326069 A1 * 12/1993  .......... G02B 6/4444

*Primary Examiner* — Michelle R Connelly
(74) *Attorney, Agent, or Firm* — Muncy, Geissler, Olds & Lowe, P.C.

(57) ABSTRACT

An optical fiber distribution box includes a base, a seat, an input tube and output tubes. The seat includes a standing wall, two protruding ribs and two holes. The standing wall is disposed behind and connected to the base and has a positioning hole formed therethrough along a front-to-rear direction. The protruding ribs rearwardly extend from the standing wall, are opposite along a left-to-right direction, and respectively formed with two through holes for extension of a binding belt. The holes extend through the standing wall and respectively through the protruding ribs and flank the positioning hole.

11 Claims, 12 Drawing Sheets

(56) References Cited

U.S. PATENT DOCUMENTS

| | | | |
|---|---|---|---|
| 2008/0219631 A1* | 9/2008 | Gronvall | G02B 6/4472 385/135 |
| 2011/0026894 A1* | 2/2011 | Rudenick | G02B 6/445 385/135 |
| 2018/0081135 A1* | 3/2018 | Hill | G02B 6/4442 |

* cited by examiner

OPTICAL FIBER DISTRIBUTION BOX

CROSS-REFERENCE TO RELATED APPLICATION

This application claims priority of Taiwanese Patent Application No. 107206743, filed on May 23, 2018.

FIELD

The disclosure relates to a distribution box, more particularly to an optical fiber distribution box.

BACKGROUND

For an optical fiber distribution application, optical fibers of an optical fiber cable are usually spread through an optical fiber distribution box. Referring to FIG. 1, a conventional optical fiber distribution box 1 includes a mounting plate 11 and a housing 123. The mounting plate 11 is formed with four threaded hoes 110. The housing 123 is disposed on the mounting plate 11, and cooperates therewith to define a space therebetween, and is formed with an inlet 121 and a plurality of outlets 122. The inlet 121 permits an optical fiber cable 131 to extend therethrough into the space and the outlets 122 permit bundles of optical fibers 132 of the optical fiber 131 to extend respectively therethrough out of the space 110. The conventional optical fiber distribution box 1 is usually mounted on a wall using four screws (not shown) extending respectively into the threaded holes 110. However, it is relatively difficult to mount the conventional optical fiber distribution box 1 on a non-flat surface of an object. Thus, the applicable range for the conventional optical fiber distribution box to be mounted to objects having different shapes is limited.

SUMMARY

Therefore, an object of the disclosure is to provide an optical fiber distribution box capable of being mounted to various objects.

According to the disclosure, an optical fiber distribution box includes a base, a mount seat, a hood, at least one input terminal tube, and a plurality of output terminal tubes. The mounting seat includes a standing wall portion, two protruding ribs and two mounting holes. The standing wall portion extends along a first direction, is disposed behind and connected to the base, and is formed with a positioning hole that extends through the standing wall portion along a second direction transverse to the first direction. The protruding ribs rearwardly extend from the standing wall portion away from the base along the second direction, are spaced apart from each other along a third direction transverse to the first direction and the second direction, and are respectively formed with two through holes extending along the third direction so as to permit a binding belt to extend through the through holes. The mounting holes extend through the standing wall portion along the second direction, flank the positioning hole, are spaced apart from each other along the third direction, and respectively extend through the protruding ribs along the second direction. The hood covers the base and cooperates with the base to define a cable reception space therebetween. The input terminal tube extends from the base along the first direction, is disposed outwardly of the cable reception space, and is adapted for an optical fiber cable to extend into the cable reception space therethrough. The output terminal tubes extend from the base along the first direction, are disposed outwardly of the cable reception space, and are adapted for bundles of optical fibers of the optical fiber cable to extend out of the cable reception space through the output terminal tubes, respectively.

BRIEF DESCRIPTION OF THE DRAWINGS

Other features and advantages of the disclosure will become apparent in the following detailed description of the embodiment with reference to the accompanying drawings, of which.

DETAILED DESCRIPTION

Figure 1:
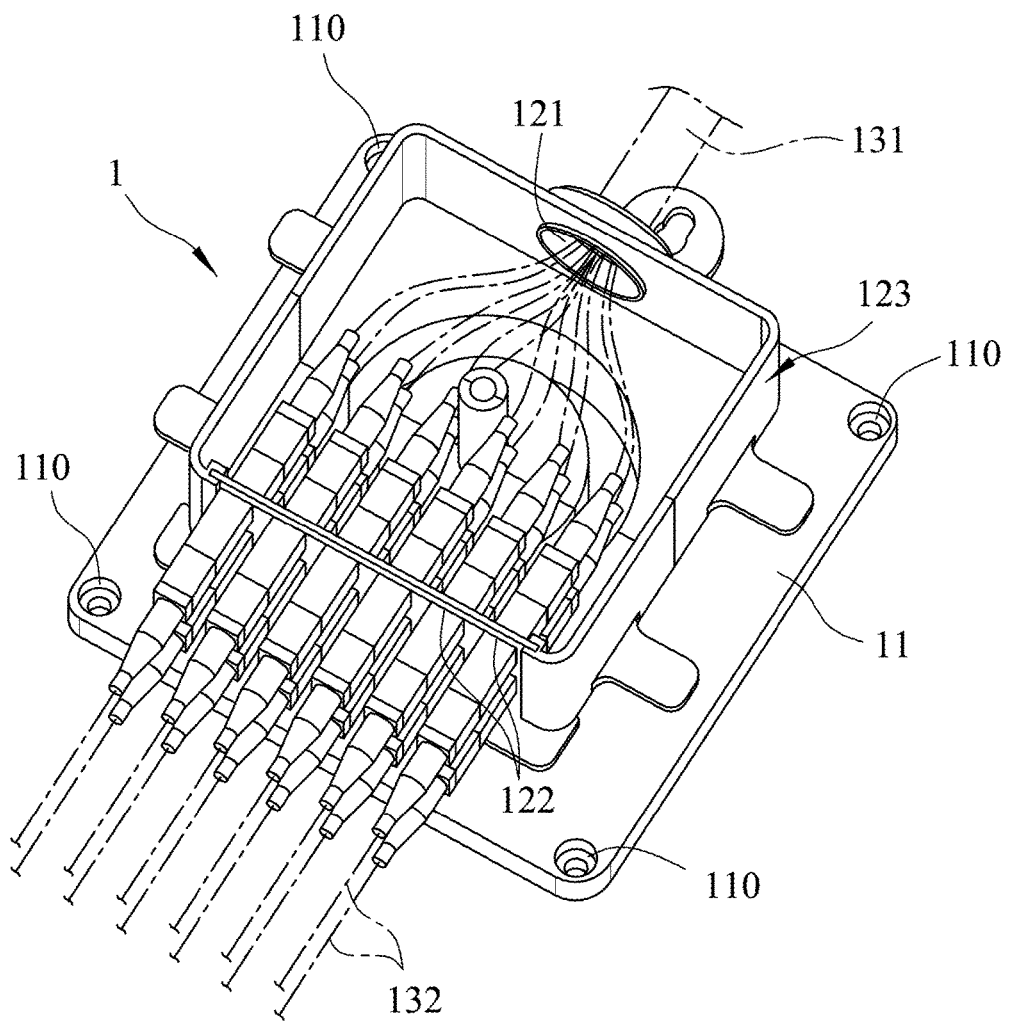
FIG. 1 is a schematic perspective view of a conventional optical fiber distribution box.
Figure 2:
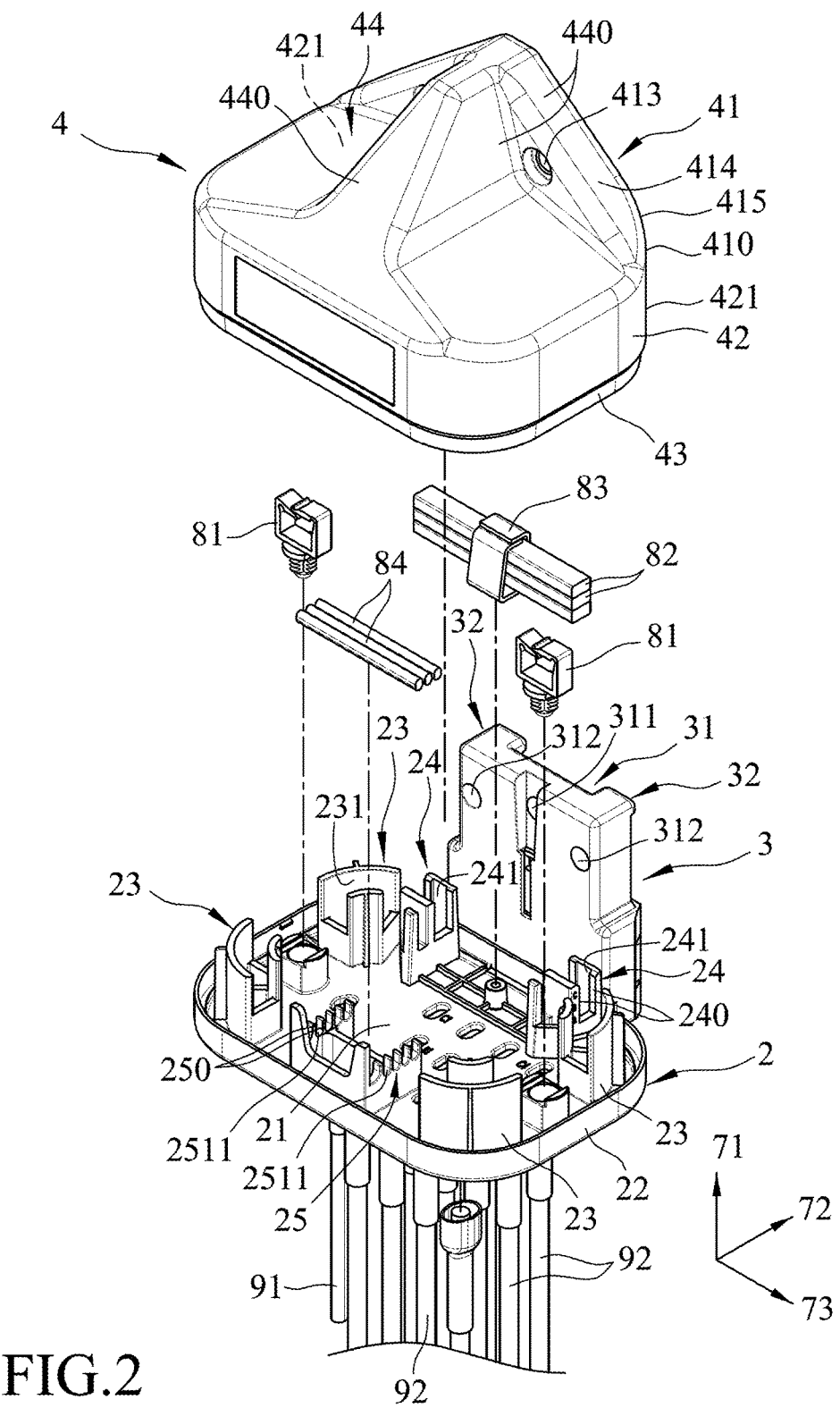
FIG. 2 is a partly exploded perspective view of an optical fiber distribution box according to an embodiment of the present disclosure.
Figure 3:
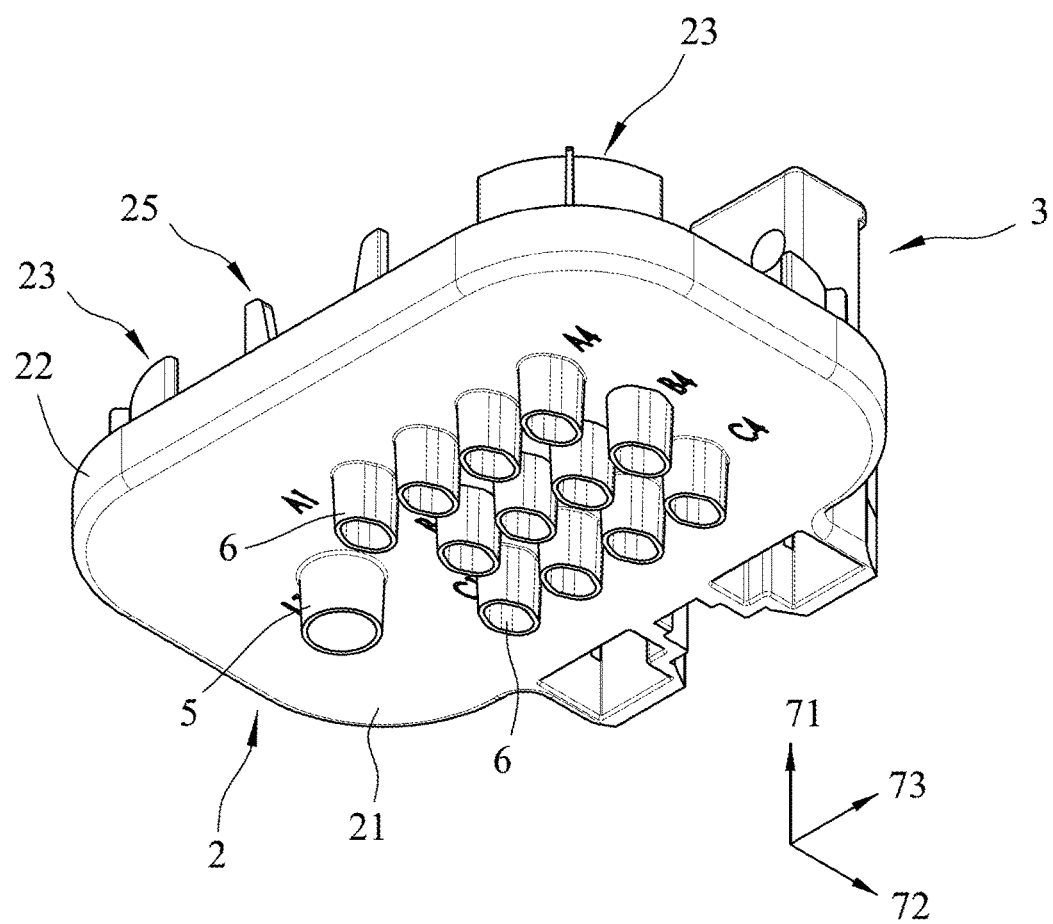
FIG. 3 is a fragmentary perspective view of the optical fiber distribution box of the embodiment.
Figure 4:
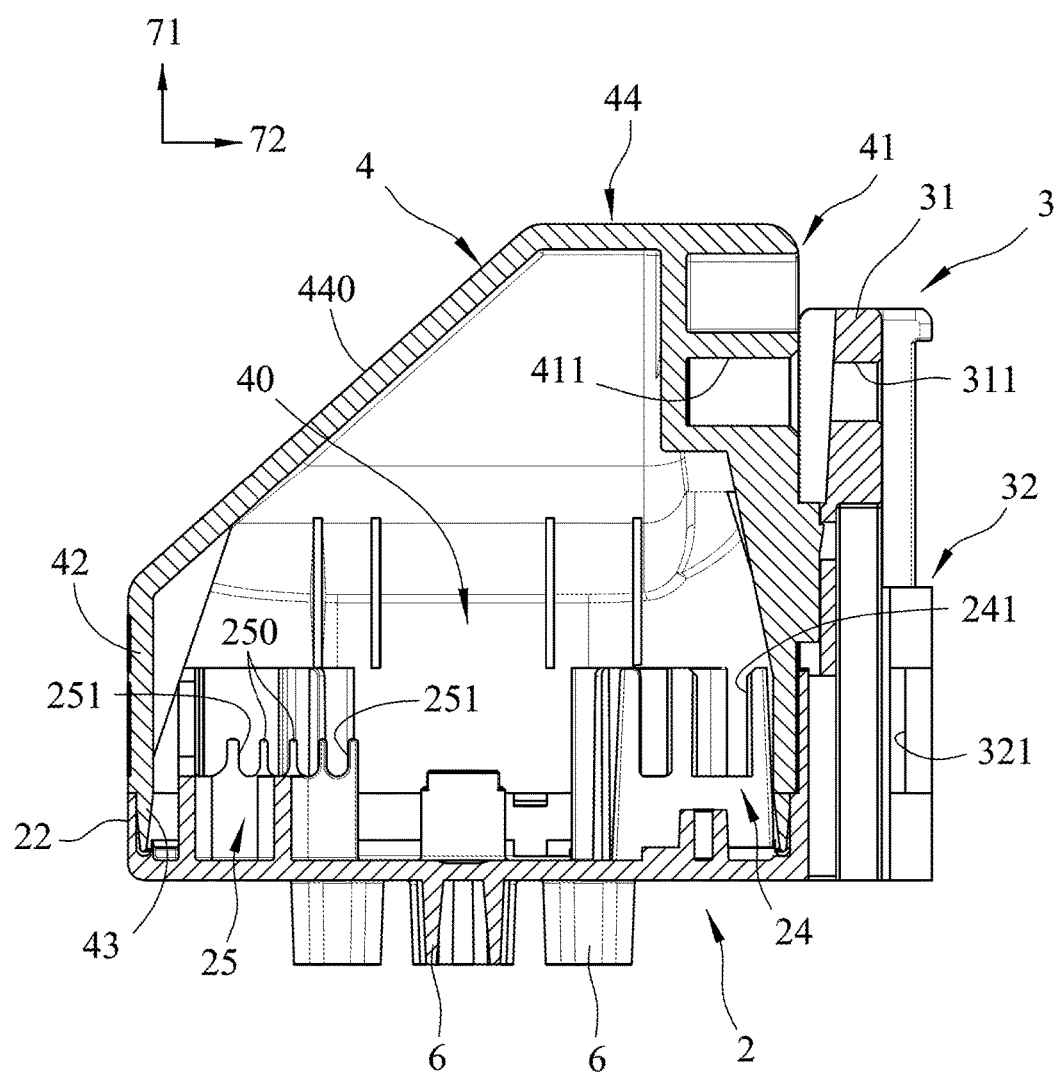
FIG. 4 is sectional view of the optical fiber distribution box.

Referring to FIGS. 2 to 4, an embodiment of an optical fiber distribution box of the present disclosure includes a base 2, a mounting seat 3, a hood 4, an input terminal tube 5 and a plurality of output terminal tubes 6. The hood 4 covers the base 2 and cooperates with the base 2 to define a cable reception space 40 therebetween. The input terminal tube 5 and the output terminal tubes 6 are in spatial communication with the cable reception space 40. The input terminal tube 5 is adapted for an optical fiber cable 91 to extend into the cable reception space 40 therethrough and the output terminal tubes 6 are adapted for bundles of optical fibers 92 of the optical fiber cable 91 to extend out of the cable reception space 40 through the output terminal tubes 6, respectively. Note that the hood 4 is not shown in FIG. 3. The output terminal tubes 6 are not in spatial communication with the cable reception space 40 when being manufactured, and are operated by a user of the optical fiber distribution box to make the output terminal tubes 6 to be in spatial communication with the cable reception space 40 as desired. In this way, undesired dust and rain water would not enter the cable reception space 40 through the output terminal tubes 6.

Figure 5:
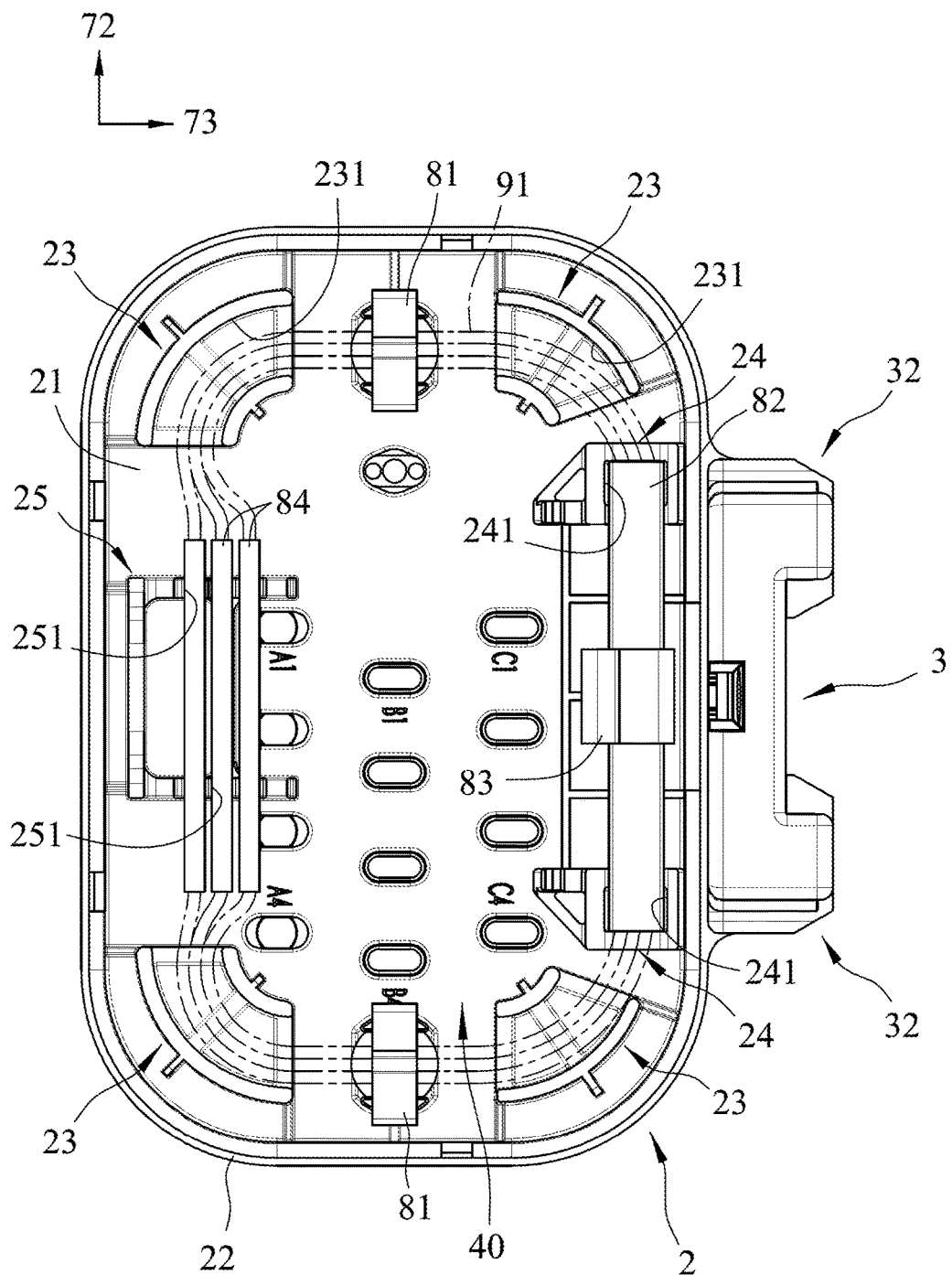
FIG. 5 is a top view of the base and a mounting seat of the optical fiber distribution box of the embodiment.

Further referring to FIG. 5, the base 2 includes a bottom wall 21, a circumferential wall 22, four winding racks 23, two first brackets 24 and a second bracket 25. The input terminal tube 5 and the output terminal tubes 6 are disposed outwardly of the cable reception space 40, and extend from the bottom wall 21 along a first direction 71 (i.e., vertical direction). The circumferential wall 22 extends upwardly from a periphery of the bottom wall 21 along the first direction 71. The winding racks 23 extend from the bottom wall 21 along the first direction 71 into the cable reception space 40 and are respectively disposed at four corners along the periphery of the bottom wall 21. Each of the winding racks 23 defines a cable arranging region 231 and is configured to permit an optical fiber cable 91 (as shown by phantom lines in FIG. 5) to be wound thereon such that the optical fiber cable 91 extends through each able arranging region 231. In this embodiment, for any two of the winding racks 23 that are spaced apart from and aligned with each other along a second direction 72 (i.e., front-to-rear direction) transverse to the first direction 71, a cable clip 81 is disposed therebetween and spaced apart therefrom along the second direction 72 to facilitate arrangement of the optical fiber cable 91.

The first brackets 24 extend from the bottom wall 21 along the first direction 71 into the cable reception space 40, are disposed adjacent to a rear side of the bottom wall 21, and are spaced apart from each other along a third direction 73 (i.e., left-to-right direction) transverse to the first direction 71 and the second direction 73. Each of the first brackets 24 includes two pillar portions 240 spaced apart from each other along the second direction 72, and defining a slot 241 therebetween. The slots 241 are adapted to permit a plurality of planar lightwave circuit (PLC) optical splitters 82, which are arranged in a stack and through which the optical fiber 91 extends, extends therethrough.

In this embodiment, an additional clip 83 may also be used to bind the PLC optical splitters 82 together.

The second bracket 25 extends from a front side of the bottom wall 21 along the first direction 71 into the cable reception space 40, is spaced apart from the first brackets 24 along the second direction 72, and includes multiple pairs of aligned upright rib portions 250 (see FIG. 4) defining a plurality of adjacent groove units 251. Any two adjacent pairs of the rib portions 250 are spaced apart from each other along the second direction 72 to define a corresponding one of the groove units 251 therebetween. The groove units 251 are arranged along the second direction 72, extend along the third direction 73, and are adapted to permit a plurality of sleeve tubes 84 to respectively extend therethrough. In this embodiment, any two adjacent rib portions 250 define a groove 2511 such that, each pair of rib portions 250 is spaced apart from each other along the third direction 73. The winding racks 23, the first brackets 24 and the second bracket 25 are all disposed in the cable reception space 40.

Figure 6:
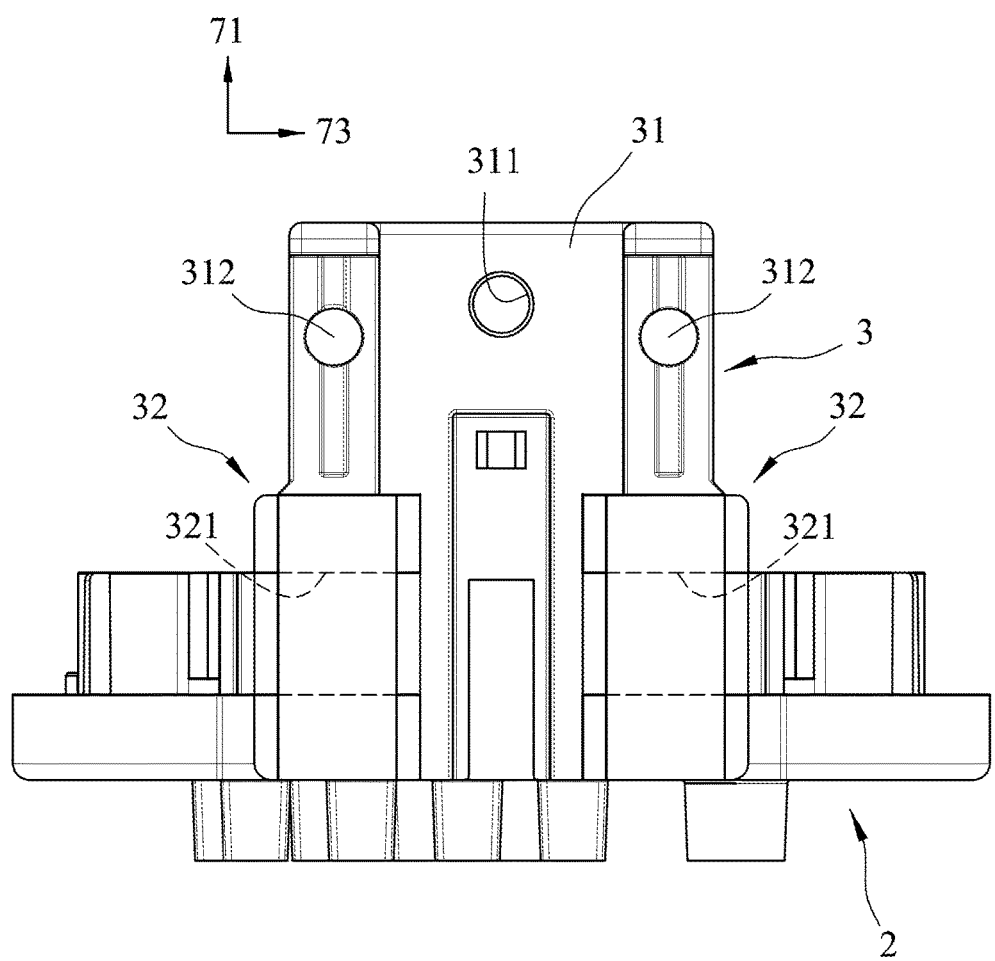
FIG. 6 is a schematic rear view of the optical fiber distribution box.

Further referring to FIG. 6, the mounting seat 3 includes a standing wall portion 31, two protruding ribs 32, and two threaded mounting holes 312. The standing wall portion 31 extends along the first direction 71, is disposed behind and connected to the base 2, and is formed with a positioning hole 311 extending through the standing wall portion 31 along the second direction 72. The protruding ribs 32 rearwardly extend from the standing wall portion 31 away from the base 2 along the second direction 72, are spaced apart from each other along the third direction 73, and are respectively formed with two through holes 321 extending along the third direction 73. The mounting holes 312 extend through the standing wall portion 31 along the second direction 72, flank the positioning hole 311, are spaced apart from each other along the third direction 73, and respectively extend through the protruding ribs 32 along the second direction 72.

Figure 7:
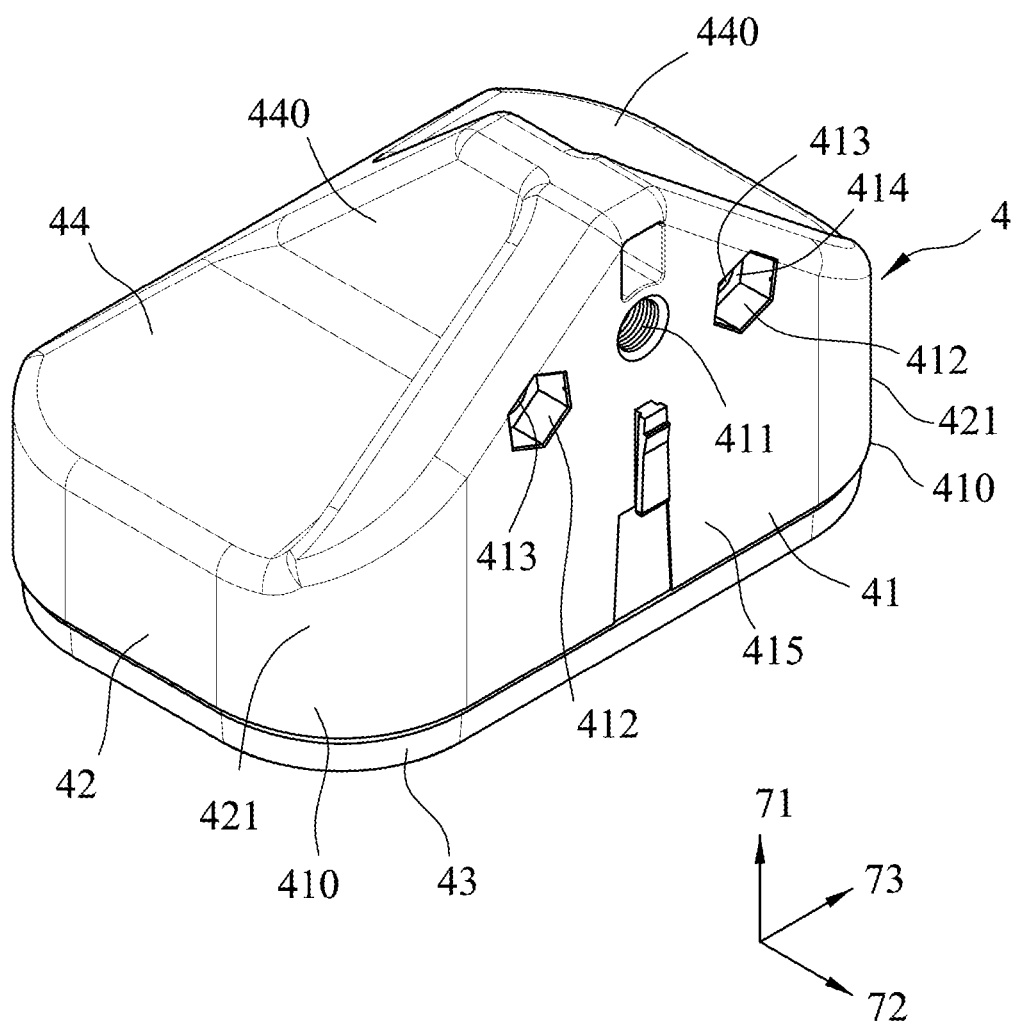
FIG. 7 is a perspective view of a hood of the optical fiber distribution box.
Figure 8:
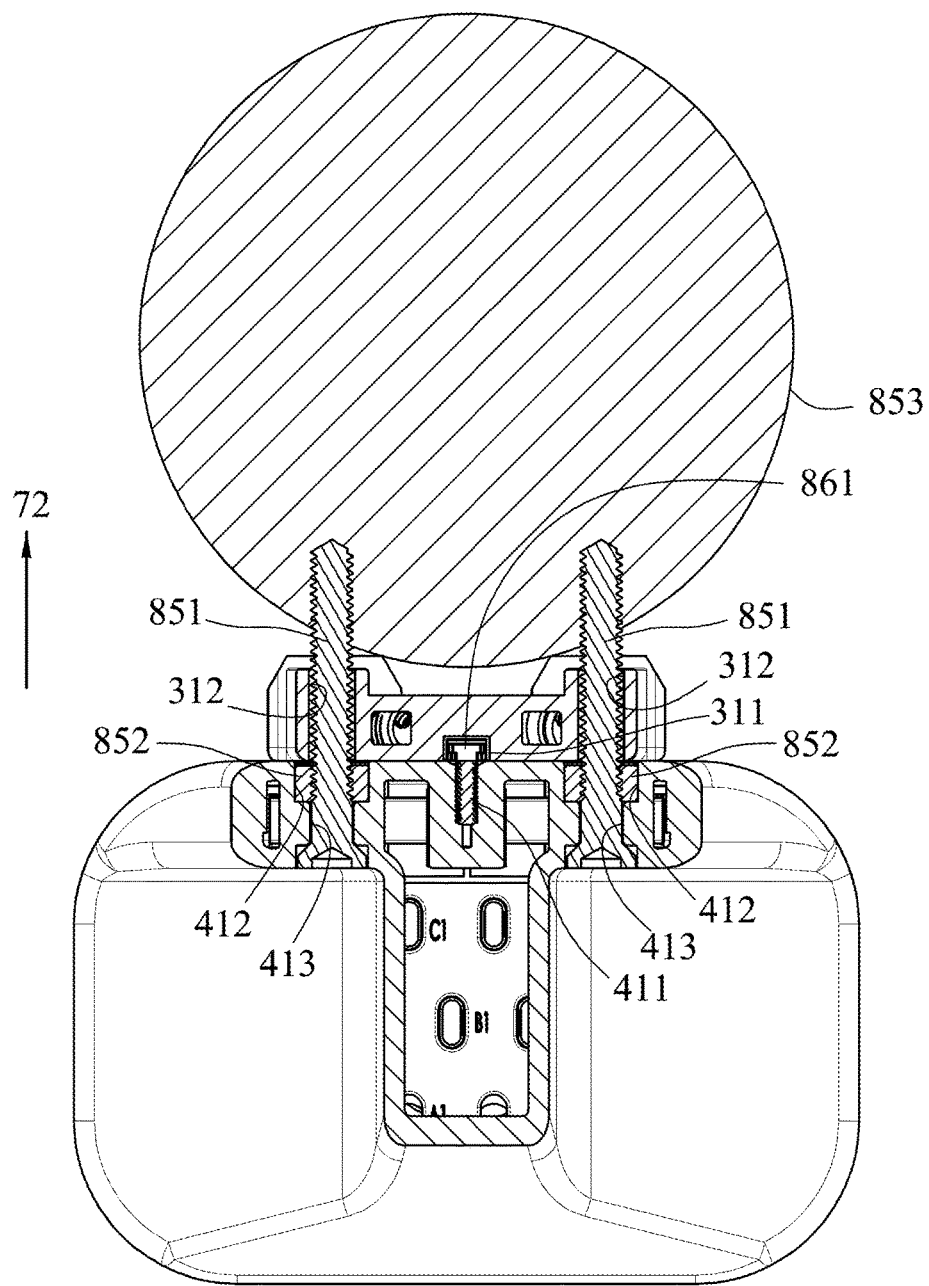
FIG. 8 is a schematic sectional view illustrating the optical fiber distribution box mounted to an object.

Further referring to FIGS. 7 to 8, the hood 4 includes a positioning wall 41, a surrounding wall 42, a protruding flange 43 and a roof wall 44. The positioning wall 41 extends along the first direction 71, and has two sides 410 opposite to each other along the third direction 73, and front and rear surfaces 414, 415 opposite to each other along the second direction 72. The surrounding wall 42 has two ends 421 respectively connected to the sides 410 of the positioning wall 41. The protruding flange 43 downwardly extends from a periphery of the surrounding wall 42 along the first direction 71, is disposed on the bottom wall 21, such that the circumferential wall 22 is sleeved tightly on the protruding flange 43. The roof wall 44 is connected to upper ends of the surrounding wall 42 and the positioning wall 41 to enclose the cable reception space 40 therein and includes a plurality of inclined wall portions 440 inclined relative to the first direction 71 for guiding rain water and snow to slide off, so that the rain water and snow left on the roof wall 44 are reduced.

The rear surface 415 of the positioning wall 41 abuts against the standing wall portion 31 and is formed with a threaded hole 411 and two hexagonal nut-receiving recesses 412. The threaded hole 411 extends along the second direction 72 and corresponds in position to and is in spatial communication with the positioning hole 311 along the second direction 72 and is adapted to permit a screw 861 to extend through the positioning hole 311 to engage the threaded hole 411. The hexagonal nut-receiving recesses 412 flank the threaded hole 411 and are adapted for fittingly receiving two nuts 852 therein. The front surface 414 of the positioning wall 41 is formed with two counterbores 413 extending along the second direction 72, in spatial communication with the nut-receiving recesses 412, respectively, and adapted to permit two bolts 851 to respectively extend therein and through the nut-receiving recesses 412 and respectively engage the nuts 852.

As shown in FIG. 8, to mount the optical fiber distribution box on an object 853, two bolts 851 are utilized to fasten the optical fiber distribution box to the object 853, such that each of the bolts 851 extends through a respective one of the counterbores 413 and a respective one of the nut-receiving recesses 412 to respectively engage the nuts 852, so as to further extend into and engage threadedly the object 853. In this example, the object 853 has a curved surface to be mounted with the optical fiber distribution box. Alternatively, the optical fiber distribution box may be mounted on a flat surface of other object.

Figure 9:
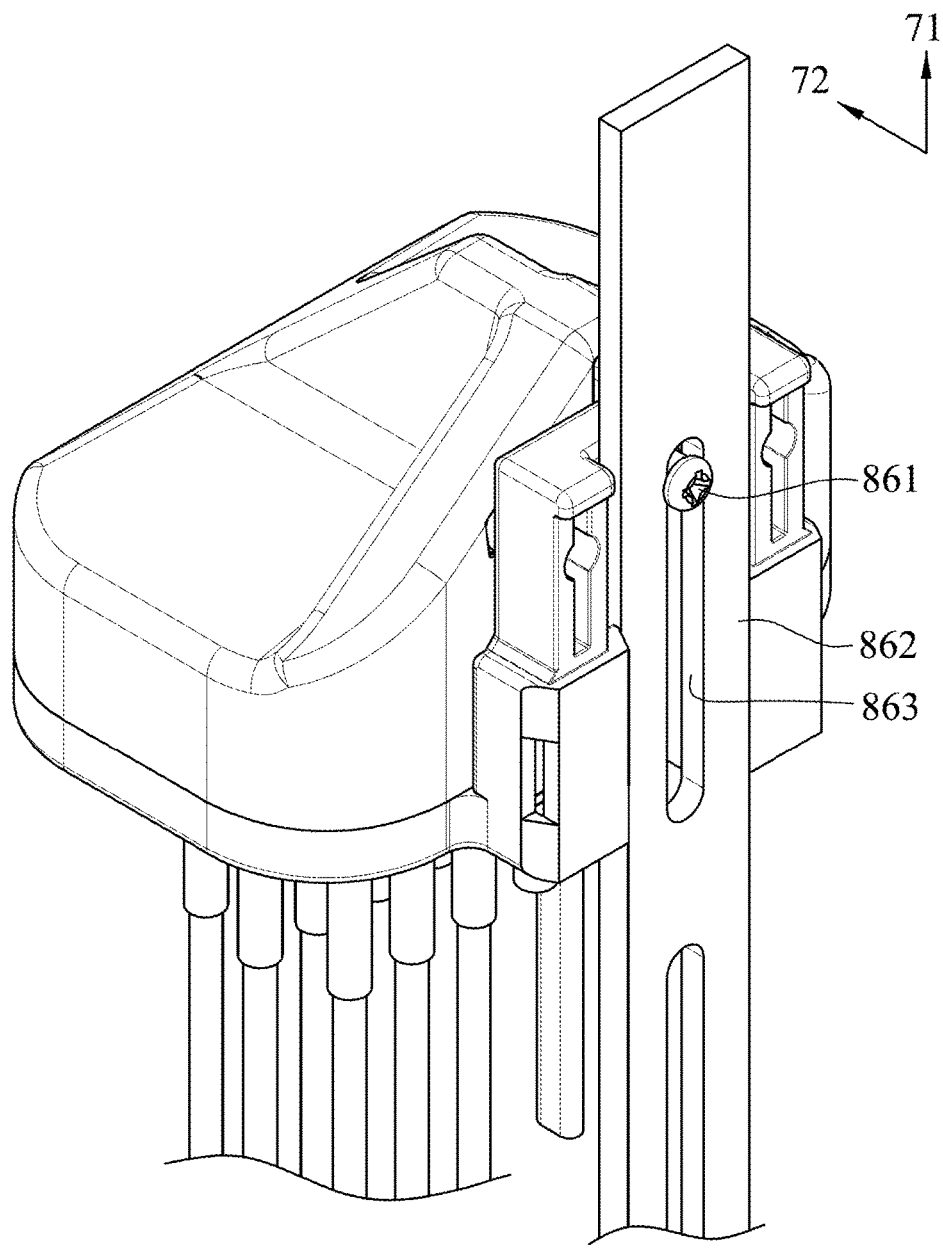
FIGS. 9 to 12 are schematic perspective views illustrating that the optical fiber distribution box is capable of being mounted to different objects.

Now referring to FIG. 9, to mount the optical fiber distribution box of the present disclosure on a slide rail 862 extending along the first direction 72, the screw 861 is utilized to extend through an elongated slot 863 formed in the slide rail 862 and extending along the first direction 71 and through the positioning hole 311 to engage the threaded hole 411. In this way, the optical fiber distribution box can be mounted securely on the slide rail 862. Additionally, since the screw 861 can be moved along the elongated slot 863, the height of the optical fiber distribution box mounted on the slide rail 862 can be adjusted as desired.

Figure 10:
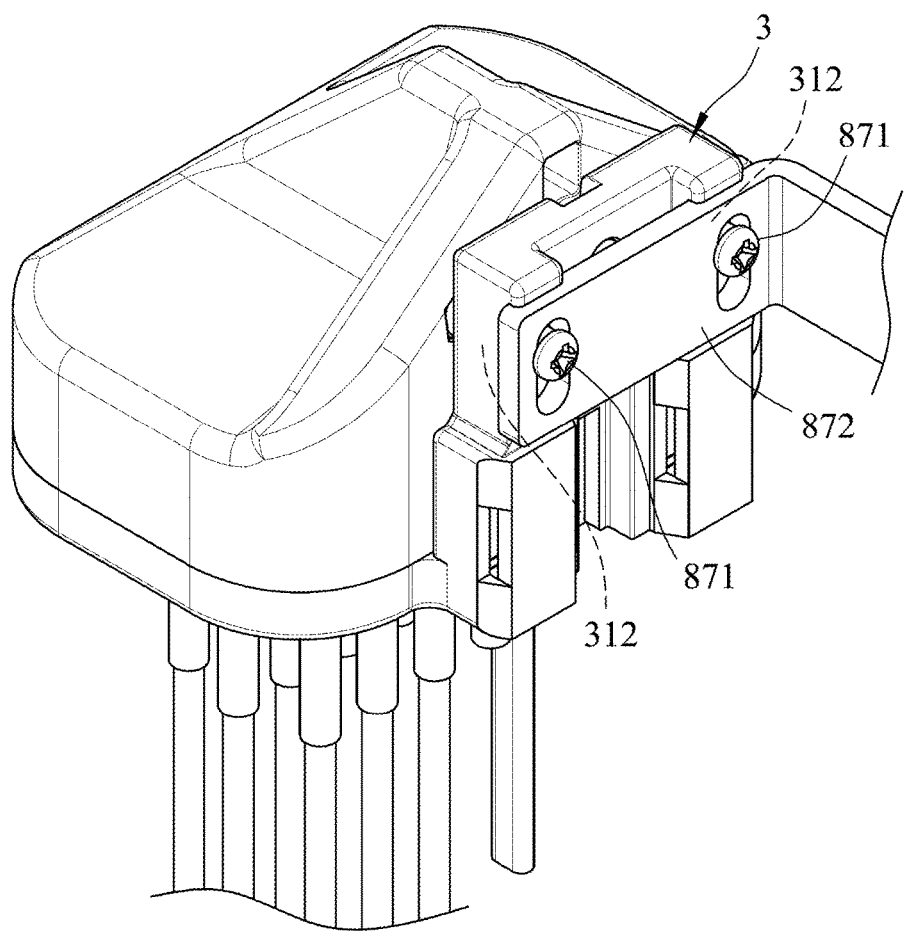
Figure 11:
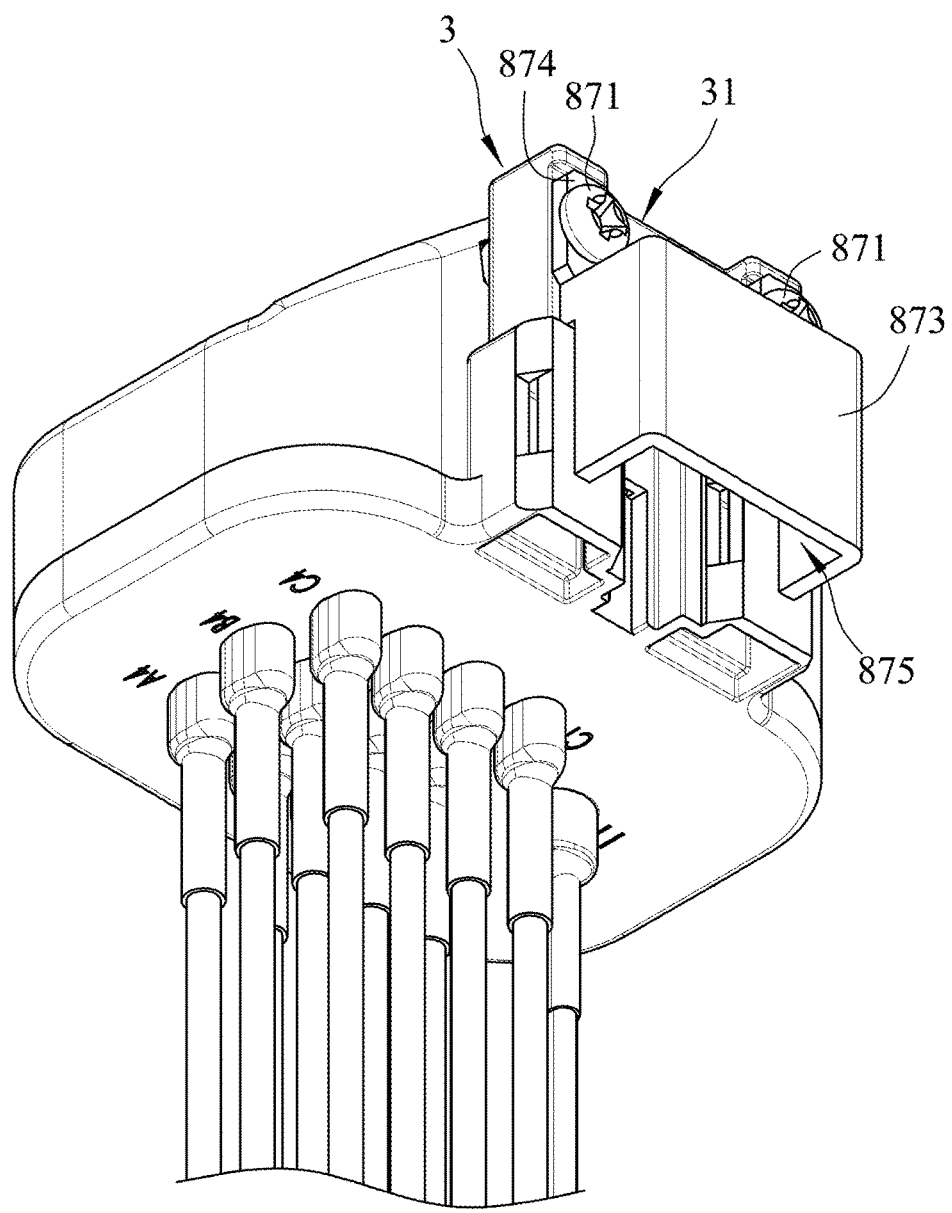

Referring to FIG. 10, an example of the optical fiber distribution box mounted on an L-shaped plate 872 is shown. In this example, two screws 871 extend through the L-shaped plate 872 to engage threadedly the mounting holes 312 of the mounting seat 3, so as to secure the mounting seat 3 to the L-shaped plate 872. Further referring to FIG. 11, another example is similar to that shown in FIG. 10, and is mounted on a U-shaped wall 873 including a flat block 874 that extends upwardly along the first direction 71 and that is formed with two holes. In the example shown in FIG. 11, two screws 871 respectively extend through the holes of the flat block 874, and engage the mounting holes 312, respectively. The U-shaped wall 873 cooperates with the standing wall portion 31 to define a space 875 therebetween such that the U-shaped wall 873 mounted with the optical fiber distribution box can be sleeved on a slender object to thereby provide a versatile mounting capability to the optical fiber distribution box of the present disclosure.

Figure 12:
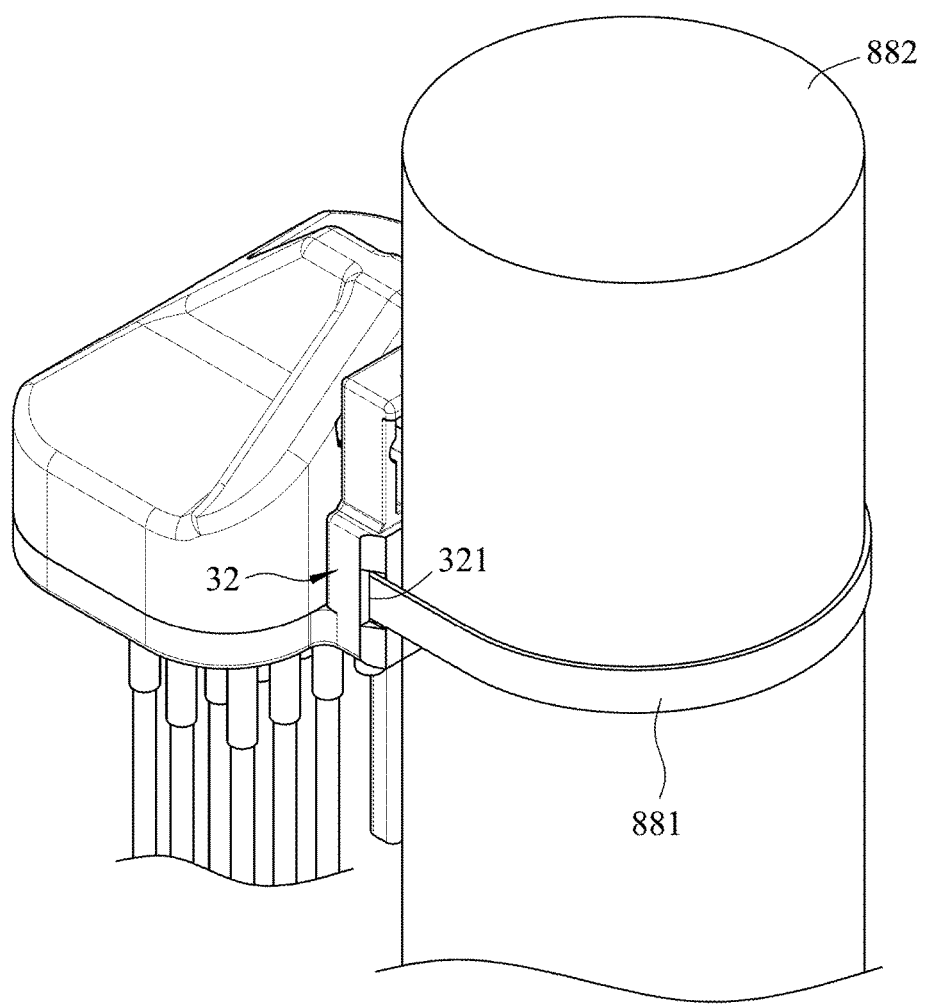

Finally, referring to FIG. 12, yet another example of the optical fiber distribution box mounted to a pillar 882 is shown. Instead of the use of screws described in FIGS. 8 to 10, a binding belt 881 is provided to surround the pillar 882 and extend through the two through holes 321 formed in the protruding ribs 32 to bind the pillar 882 to the mounting seat 3. In this way, the optical fiber distribution box can be secured to the pillar 882 having a curved surface without threaded holes.

In the description above, for the purposes of explanation, numerous specific details have been set forth in order to provide a thorough understanding of the embodiment. It will be apparent, however, to one skilled in the art, that one or more other embodiments may be practiced without some of these specific details. It should also be appreciated that reference throughout this specification to "one embodiment," "an embodiment," an embodiment with an indication of an ordinal number and so forth means that a particular feature, structure, or characteristic may be included in the practice of the disclosure. It should be further appreciated that in the description, various features are sometimes grouped together in a single embodiment, figure, or description thereof for the purpose of streamlining the disclosure and aiding in the understanding of various inventive aspects, and that one or more features or specific details from one embodiment may be practiced together with one or more features or specific details from another embodiment, where appropriate, in the practice of the disclosure.

While the disclosure has been described in connection with what is considered the exemplary embodiment, it is understood that this disclosure is not limited to the disclosed embodiment but is intended to cover various arrangements included within the spirit and scope of the broadest interpretation so as to encompass all such modifications and equivalent arrangements.

What is claimed is:

1. An optical fiber distribution box comprising:
    a base;
    a mounting seat including
        a standing wall portion extending along a first direction and disposed behind and connected to said base, said standing wall portion being formed with a positioning hole that extends through said standing wall portion along a second direction transverse to the first direction,
        two protruding ribs rearwardly extending from said standing wall portion away from said base along the second direction, spaced apart from each other along a third direction transverse to the first direction and the second direction, respectively formed with two through holes extending along the third direction, and adapted to permit a binding belt to extend therethrough, and
        two mounting holes that extend through said standing wall portion along the second direction, that flank said positioning hole, that are spaced apart from each other along the third direction, and that respectively extend through said protruding ribs along the second direction;
    a hood covering said base and cooperating with said base to define a cable reception space therebetween;
    at least one input terminal tube downwardly extending from said base along the first direction, disposed outwardly of said cable reception space, and adapted for an optical fiber cable to extend into said cable reception space therethrough;
    a plurality of output terminal tubes downwardly extending from said base along the first direction, disposed outwardly of said cable reception space, and adapted for bundles of optical fibers of the optical fiber cable to extend out of said cable reception space through said output terminal tubes, respectively.

2. The optical fiber distribution box as claimed in claim 1, wherein the hood includes a positioning wall extending along the first direction and having a rear surface abutting against said standing wall portion and formed with a threaded hole that extends along the second direction and that corresponds in position to and is in spatial communication with said positioning hole along the second direction and that is adapted to permit a screw to extend through said positioning hole to engage said threaded hole.

3. The optical fiber distribution box as claimed in claim 2, wherein said rear surface of said positioning wall is further formed with two hexagonal nut-receiving recesses flanking said threaded hole and adapted for respectively and fittingly receiving two nuts, said positioning wall further having a front surface opposite to said rear surface along the second direction and formed with two counterbores, extending along the second direction, in spatial communication with said nut-receiving recesses, respectively, and adapted to permit two bolts to respectively extend through said counterbores and through said nut-receiving recesses and respectively engage the nuts.

4. The optical fiber distribution box as claimed in claim 2, wherein said positioning wall has two opposite sides opposite to each other along the third direction, said hood further including a surrounding wall that has two opposite ends respectively connected to said sides of said positioning wall, and a roof wall connected to upper ends of said surrounding wall and said positioning wall to enclose said cable reception space therein.

5. The optical fiber distribution box as claimed in claim 4, wherein said roof wall includes a plurality of inclined wall portions inclined relative to the first direction.

6. The optical fiber distribution box as claimed in claim 1, wherein said base includes:
    a bottom wall from which said input terminal tube and said output terminal tubes extend outwardly of said cable reception space;
    a circumferential wall upwardly extending from a periphery of said bottom wall along the first direction; and
    a plurality of winding racks extending from said bottom wall along the first direction into said cable reception space and disposed along said periphery of said bottom wall, each of said winding racks defining a cable arranging region and being adapted to permit an optical fiber cable to be wound thereon, said cable arranging regions of said winding racks being adapted to permit the optical cable to extend therethrough.

7. The optical fiber distribution box as claimed in claim 6, wherein said base further includes two first brackets extending from said bottom wall along the first direction into said cable reception space, disposed adjacent to a rear side of said bottom wall, and spaced apart from each other along the third direction, each of said first brackets defining a slot which is adapted to permit the optical fiber cable to extend therethrough.

8. The optical fiber distribution box as claimed in claim 7, wherein each of said first brackets includes at least two pillar portions spaced apart from each other along the second direction and defining a slot therebetween.

9. The optical fiber distribution box as claimed in claim 7, wherein said base further includes a second bracket extending from said bottom wall along the first direction into said cable reception space, spaced apart from said first brackets along the second direction, and defining a plurality of adjacent groove units extending along the third direction, arranged along the second direction, and adapted to permit a plurality of sleeve tubes to respectively extend therethrough.

10. The optical fiber distribution box as claimed in claim 9, wherein said second bracket includes multiple pairs of aligned upright rib portions that are spaced apart from one another in the second direction, any two adjacent pairs of said rib portions defining a respective one of said groove unit therebetween.

11. The optical fiber distribution box as claimed in claim 1, wherein said input terminal tube is in spatial communication with said cable reception space, and said output terminal tubes are in spatial communication with said cable reception space.

* * * * *